United States Patent
Duval

(10) Patent No.: US 7,404,921 B2
(45) Date of Patent: Jul. 29, 2008

(54) METHOD AND SYSTEM FOR THE MANUFACTURE OF ANNULAR FIBROUS PREFORMS

(75) Inventor: Renaud Duval, Lozanne (FR)

(73) Assignee: Messier-Bugatti, Velizy Villacoublay (FR)

( * ) Notice: Subject to any disclaimer, the term of this patent is extended or adjusted under 35 U.S.C. 154(b) by 805 days.

(21) Appl. No.: 10/515,036

(22) PCT Filed: May 22, 2003

(86) PCT No.: PCT/FR03/01547

§ 371 (c)(1),
(2), (4) Date: Nov. 18, 2004

(87) PCT Pub. No.: WO03/100148

PCT Pub. Date: Dec. 4, 2003

(65) Prior Publication Data

US 2005/0172465 A1 Aug. 11, 2005

(30) Foreign Application Priority Data

May 23, 2002 (FR) .................................. 02 06262

(51) Int. Cl.
*D04H 1/70* (2006.01)
*D04H 17/00* (2006.01)
(52) U.S. Cl. ........................... 264/517; 19/302; 19/308; 28/103; 28/107; 264/113; 264/119; 425/80.1; 425/81.1
(58) Field of Classification Search ................. 264/109, 264/113, 119, 121, 517; 425/80.1, 81.1, 425/82.1; 19/296, 302, 308; 28/100, 101, 28/103, 107
See application file for complete search history.

(56) References Cited

U.S. PATENT DOCUMENTS

| 4,666,647 A | * | 5/1987 | Enloe et al. .................. 264/517 |
| 4,790,052 A | | 12/1988 | Olry |
| 5,662,855 A | | 9/1997 | Liew et al. |
| 5,792,715 A | | 8/1998 | Duval et al. |

(Continued)

FOREIGN PATENT DOCUMENTS

EP 0 424 988 5/1991

(Continued)

*Primary Examiner*—James Mackey
(74) *Attorney, Agent, or Firm*—Weingarten, Schurgin, Gagnebin & Lebovici LLP

(57) ABSTRACT

Free fibers (10) are deposited on a rotary support turntable (30) by means of a hollow deposition cone (40) having an outer wall surrounding a chamber and pierced by multiple perforations. The fibers are delivered to the outer surface of the perforated wall of the cone (40) in a cone feed zone that is remote from the zone for deposition on the turntable (30), and they are then held by suction being established inside the chamber, leading to suction through the perforations in the cone, so as to be transported by rotation of the cone from the cone feed zone to the zone for deposition on the turntable, and the fibers cease to be held on the cone in the deposition zone by localized interruption of the suction through the perforations in the wall of the cone, at least in said zone, such that the transported fibers are deposited on the turntable which is rotated about its own axis simultaneously with the cone being rotated. The fibers deposited on the rotary turntable (30) may be compacted and needled.

18 Claims, 5 Drawing Sheets

U.S. PATENT DOCUMENTS

| | | | |
|---|---|---|---|
| 5,829,708 A | 11/1998 | Yingling et al. | |
| 5,955,012 A | 9/1999 | Yingling et al. | |
| 6,009,605 A | 1/2000 | Olry et al. | |
| 6,347,440 B1 * | 2/2002 | Duval et al. | 28/107 |
| 6,363,593 B1 * | 4/2002 | Duval et al. | 28/107 |
| 6,367,130 B1 * | 4/2002 | Duval et al. | 28/107 |

FOREIGN PATENT DOCUMENTS

| | | |
|---|---|---|
| EP | 0 683 261 | 11/1995 |
| FR | 2 626 294 | 7/1989 |
| FR | 2 759 387 | 8/1998 |
| FR | 2 764 311 | 12/1998 |
| FR | 2 824 084 | 10/2002 |
| FR | 2 824 085 | 10/2002 |
| FR | 2 824 086 | 10/2002 |
| WO | WO 97 20092 | 6/1997 |

* cited by examiner

METHOD AND SYSTEM FOR THE MANUFACTURE OF ANNULAR FIBROUS PREFORMS

This application is a 371 national phase filing of PCT/FR03/01547 filed May 22, 2003, and claims priority to a French application No. 02/06262 filed May 23, 2002.

BACKGROUND OF THE INVENTION

The invention relates to manufacturing annular fiber preforms, in particular porous preforms for constituting the reinforcement of annular parts made of composite material and obtained by densifying preforms with a matrix.

The particular field of application of the invention is making fiber preforms for annular friction parts made of composite material such as clutch disks or brake disks made of thermostructural composite material. Such disks comprise fiber reinforcement, generally made of carbon fibers, densified by a matrix of carbon and/or ceramic.

A method commonly used for making fiber reinforcement for a disk of composite material, in particular for a brake disk of carbon/carbon (C/C) composite material, consists in making an annular preform by stacking plies of two-dimensional fiber fabric.

Suitable two-dimensional fiber fabrics are woven cloth, sheets made up of one-directional fibers, multidirectional sheets made up of a plurality of one-directional sheets superposed in different directions and bonded together, e.g. by needling, layers of felt, or complex fabrics comprising a ply made of a woven cloth or a sheet onto which a layer of felt or of free fibers has been secured, e.g. by needling.

The plies may be superposed flat, while being bonded together by needling, so as to constitute a plate from which annular preforms can be cut out, as described for example in U.S. Pat. Nos. 4,790,052 and 5,792,715. That method is in commonplace and satisfactory use for making preforms for C/C composite material brake disks, but it leads to a large amount of scrap when cutting out the preforms.

Another known method, described in document EP 0 424 988 consists in cutting out annular sectors from two-dimensional plies and in forming an annular preform by superposing and needling rings built up by juxtaposing the sectors. That method serves to reduce the amount of scrap material, but it does not completely eliminate it, and the preforms are more difficult to make.

In order to avoid any scrap material, proposals have been made to produce annular fiber preforms by winding deformed braids or helical cloth so as to form turns that are superposed flat, which turns are bonded together by needling. Reference can be made to U.S. Pat. Nos. 5,662,855 and 6,009,605. Those methods require the use of very particular fiber fabrics—deformable braids or helical woven cloth—that are expensive to make.

OBJECT AND SUMMARY OF THE INVENTION

An object of the invention is to provide a method enabling annular fiber preforms to be made in a manner that is particularly simple and inexpensive.

This object is achieved by a method in which free fibers are deposited on a rotary support turntable by means of a hollow deposition cone having a conical outer wall surrounding a chamber and pierced by multiple perforations, the cone being disposed above the turntable and having a generator line extending in the vicinity of the top surface of the turntable and substantially parallel thereto in a zone for depositing fibers on the turntable, the fibers being deposited on the turntable by a process comprising the steps which consist in:

bringing fibers to the outer surface of the perforated wall of the cone in a cone feed zone that is remote from the deposition zone on the turntable;

holding the fibers against the outer surface of the perforated wall of the cone by establishing suction inside the chamber, thereby producing suction through the perforations in the wall of the cone;

transporting the fibers from the cone feed zone to the zone for deposition on the turntable by rotating the cone about its axis; and ceasing to hold the fibers on the cone in the deposition zone by localized interruption of the suction through the perforations in the wall of the cone, at least in said zone, so that the transported fibers are deposited on the turntable which is driven in rotation about its own axis simultaneously with the cone rotating.

Advantageously, the fibers are brought to the outer surface of the perforated wall of the cone over a fraction of said surface which extends between two generator lines of the cone, over a length measured along a generator line that is substantially equal to the width of the annular preform that is to be made. The meridian planes passing through said two generator lines form between them an angle that preferably lies in the range 10° to 40°.

Preferably, the fibers are brought to the outer surface of the perforated wall of the cone by passing through a feed channel.

Also preferably, the fibers are compressed after being deposited on the turntable.

The fibers may be deposited on the turntable in a plurality of superposed layers. In which case, and preferably, the distance between the turntable and the cone is enlarged progressively as the successive layers of fibers are deposited.

Advantageously, the fibers deposited on the turntable are bonded together to constitute a fiber preform that can be manipulated. The fibers may be bonded together by needling.

Another object of the invention is to provide an installation enabling the above-defined method to be implemented.

This object is achieved by an installation comprising:

a rotary supporting turntable;

a feed cone that is rotatable about its axis, having an outer wall of conical shape surrounding a chamber and pierced by multiple perforations, the cone being disposed above the turntable and having a generator line extending in the vicinity of the outer surface of the turntable and substantially parallel thereto in a zone for depositing fibers on the turntable;

fiber delivery means opening out in the vicinity of the outer surface of the perforated wall of the cone, in a cone feed zone remote from the zone for deposition on the turntable;

means for establishing suction inside the cone chamber in order to establish suction through the perforations in the wall of the cone; and a device for localized interruption of the suction, which device is interposed between the means for establishing suction in the chamber and the perforations in at least a fraction of the wall of the cone situated in the zone for depositing fibers on the turntable.

The fiber delivery means may be formed by a fiber feed channel which extends between a taker-in device and the cone feed zone. At least in its portion adjacent to the cone, the feed channel advantageously presents a section that is trapezoidal.

Advantageously, at least one conical compression roller is disposed about the support turntable downstream from the zone for depositing fibers on the turntable.

Also advantageously, a needling device is disposed above the support turntable downstream from the zone for depositing fibers on the turntable.

The distance between the support turntable and the feed cone may be variable.

BRIEF DESCRIPTION OF THE DRAWINGS

The invention will be better understood on reading the following description given by way of non-limiting indication, and with reference to the accompanying drawings, in which.

DETAILED DESCRIPTION OF AN EMBODIMENT OF THE INVENTION

An embodiment of the invention is described below in the context of its application to making annular fiber preforms out of carbon fibers or carbon precursor fibers for the purpose of making friction disks, in particular brake disks of carbon/carbon (C/C) composite material.

Nevertheless, the invention is not limited to this application and can be used for making any annular fiber fabric.

Figure 1:
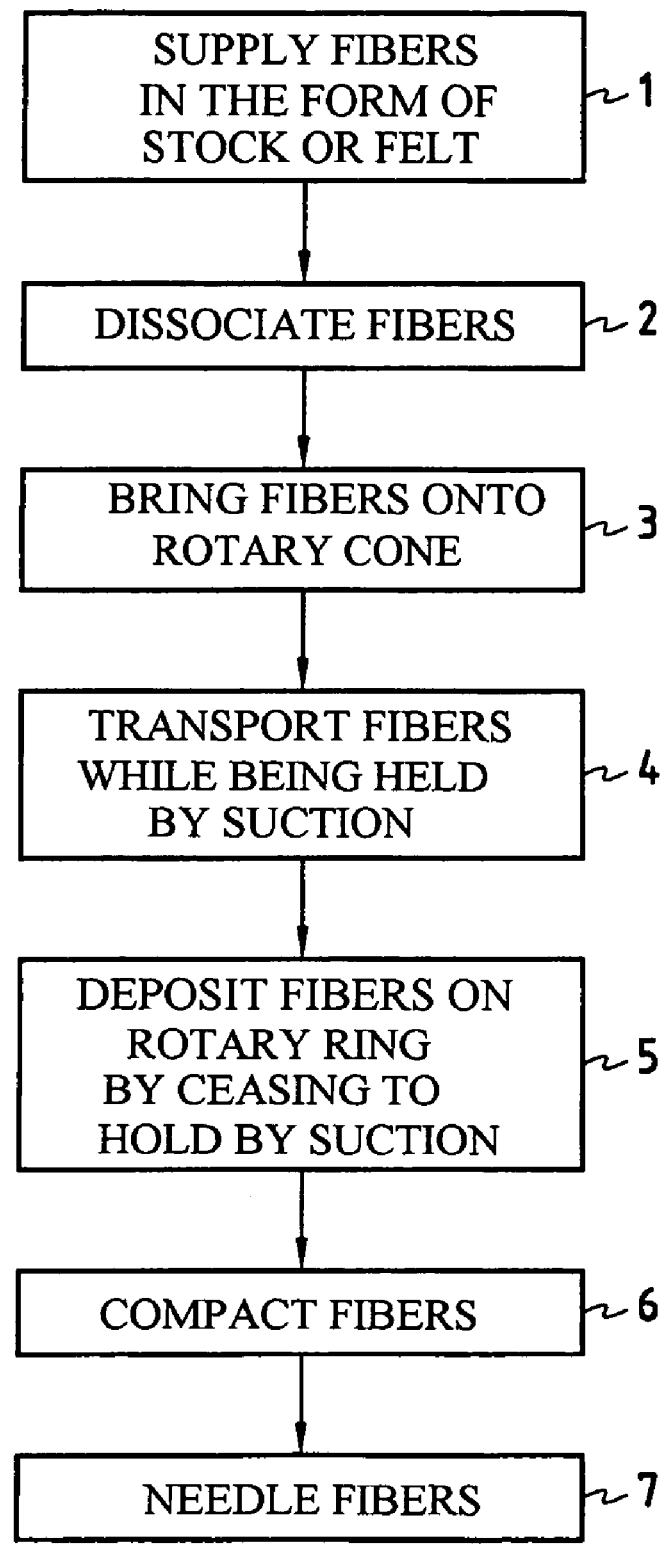
FIG. 1 shows the successive steps of an implementation of a method in accordance with the invention.

The fibers for use in making a preform are discontinuous fibers, e.g. in the form of a stock or felt (step 1 of the method of FIG. 1). The fibers are made of carbon or of a carbon precursor, for example preoxidized polyacrylonitrile (PAN).

Figure 2:
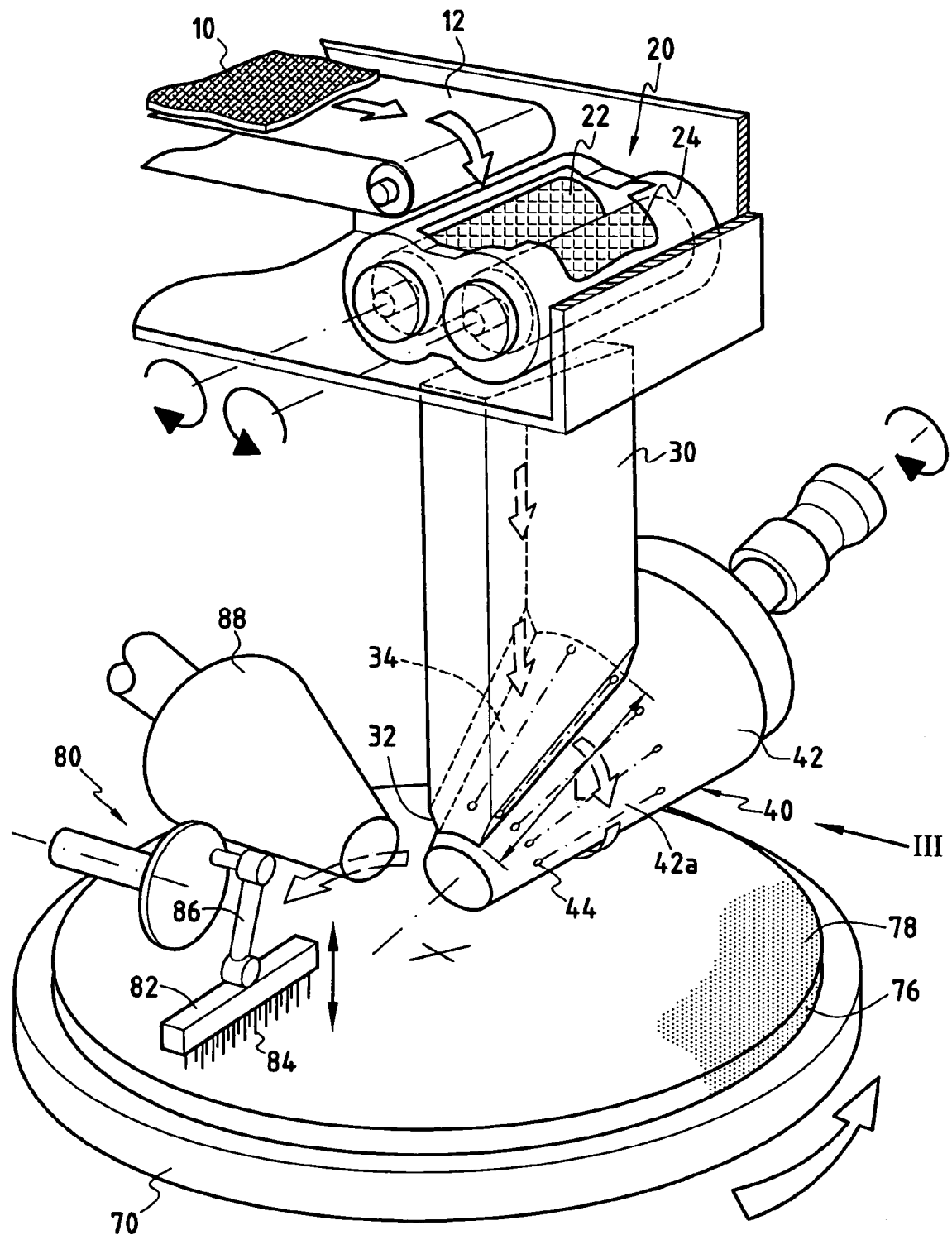
FIG. 2 is a highly diagrammatic perspective view of an embodiment of an installation in accordance with the invention.

As shown in FIG. 2, the felt or stock 10 is deposited as a layer on a conveyor 12 which brings it to a taker-in device 20. In known manner, the taker-in device 20 comprises two metal taker-in rollers 22, 24 disposed parallel to each other and in the immediate vicinity of each other. The rollers 22, 24 are driven to rotate in opposite directions at relatively high speed (several thousands of revolutions per minute (rpm)). Because of multiple pin-shaped or claw-shaped portions in relief formed on their peripheral surfaces, the rollers 22, 24 separate the fibers of the felt or stock which is delivered by the conveyor 10 overlying the gap between the rollers (step 2 of the method). At the outlet from the taker-in device, i.e. beneath the gap between the rollers 22, 24, the dissociated fibers are in the form of free fibers. These fibers are projected out from the taker-in device by the kinetic energy imparted thereto by coming into contact with the rollers, and by the air entrained by the rollers.

Figure 3:
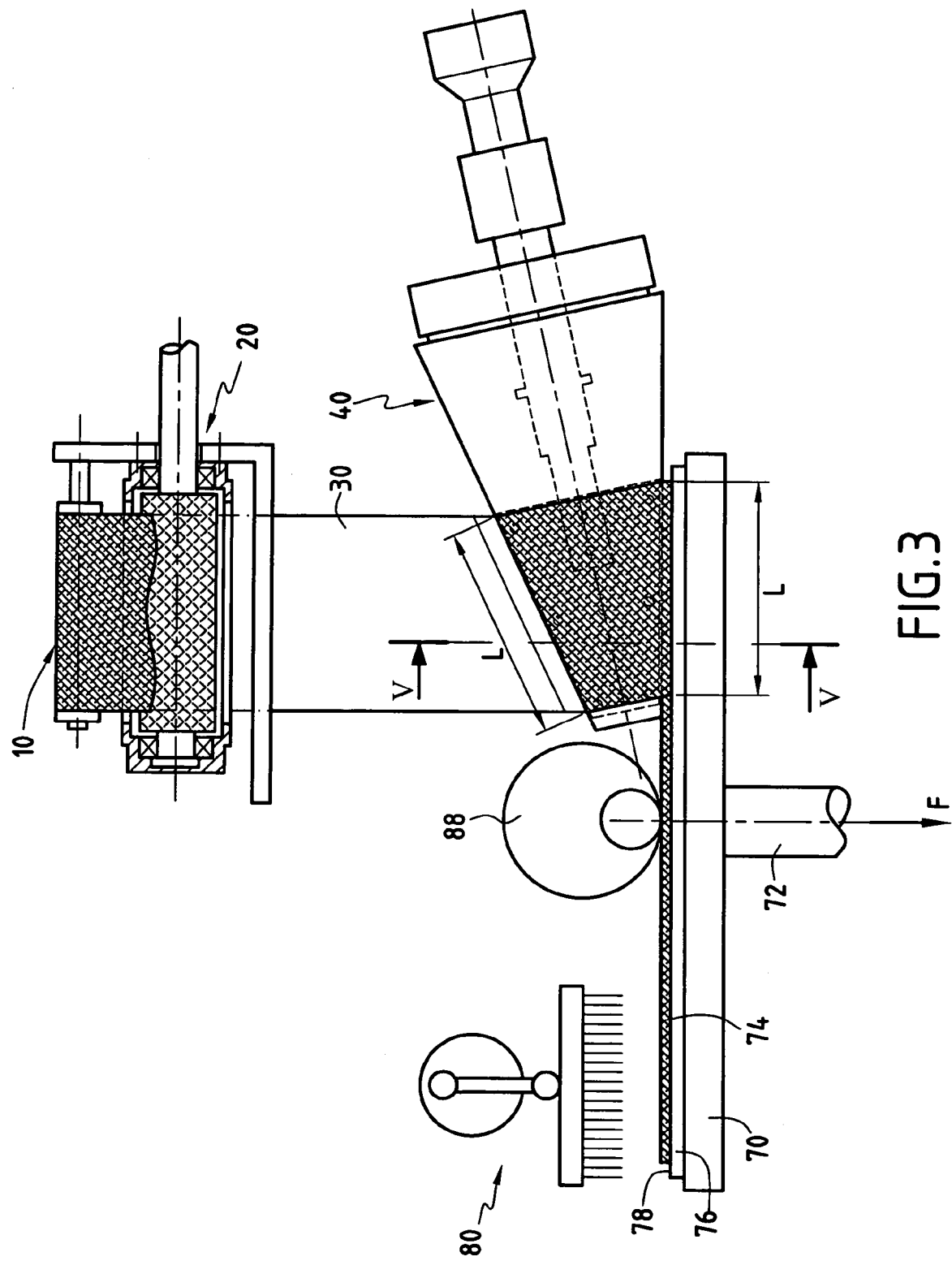
FIG. 3 is a fragmentary side view in elevation of the FIG. 2 installation.

The dissociated fibers penetrate into a channel 30 which extends between the outlet from the taker-in device 20 and the outside surface of the wall of a rotary cone 40 (step 3 of the method). The channel 30 (FIGS. 2, 3, and 5) is terminated by a nozzle-shaped portion 32 which can be made integrally with the remainder of the channel, or which can be formed by a separate part that is connected to the remainder of the channel. The nozzle 32 is of substantially trapezoidal section and terminates via an opening 34 that defines a zone for feeding the cone 40 with fibers.

The cone 40 is hollow, and its peripheral wall 42 is provided with a multitude of perforations 44, at least in a frustoconical portion 42a thereof extending between two transverse planes. The nozzle 32 opens out via the opening 34 close to the perforated frustoconical portion 42a, the zone for feeding the cone with fibers being defined by the shape of the opening 34 and extending between two generator lines of the cone and between two transverse planes over a distance L measured along a generator line of the cone.

The cone 40 which is described in greater detail below with reference to FIGS. 4 and 5, has an internal chamber 46 surrounded by the frustoconical wall 42a. By suction established in the chamber 46, the fibers delivered to the feed zone of the cone are pressed against the outside surface of the frustoconical portion 42a. The cone 40 is rotated about its axis so that the fibers held by suction to its surface are transported to a zone for deposition on a support turntable 70 in the form of a disk or a ring (step 4 of the method).

The turntable 70 is turned about its vertical axis 72 which is connected to a drive motor (not shown). The cone 40 has a horizontal generator line which extends above and close to the top surface of the turntable 70. The retention of the fibers on the cone 40 by suction is interrupted in the deposition zone, such that the fibers transported by the cone 40 are deposited on the ring 70 (step 5 of the method).

After being deposited on the ring, the fibers 10 (shown in part in FIG. 3) are compacted by means of at least one cone 88 applying a compression force (step 6 of the method). The cone 88 may be mounted free to rotate about its own axis and to exert a compacting force on the fibers by adjusting the distance between its bottom generator line, which is horizontal, and the top surface of the turntable 70. The compacted fibers are bonded together and to the fibers that have been previously been deposited on the turntable. In the embodiment shown, this bonding is performed by needling in a needling station 80 situated downstream from the compacting cone(s) in the direction of rotation of the turntable (step 7 of the method).

In known manner, the needling station 80 has a needling head 82 provided with a plurality of needles 84 extending uniformly at least over the entire width of the preform. A drive system 86 of the connecting rod and crank type imparts reciprocating vertical motion to the needling head.

The taker-in rollers 22, 24 are fed with fiber F in continuous manner, while the cone 40 and the turntable 70 are being rotated continuously. Thus, a fiber preform 74 (shown only in FIG. 3) can be built up progressively on the turntable 70 by depositing free fibers in a plurality of superposed layer and by bonding the fibers together by needling.

The rate at which the taker-in rollers are fed and the speeds of rotation of the cone 40 and of the turntable 70 determine the thickness of the successive layers of fibers deposited on the turntable.

Advantageously, the distance between the turntable 70 and the bottom horizontal generator line of the cone 40 is increased progressively as successive layers of fibers are deposited, so that the generator line is always situated at or slightly above the top face of the turntable 70 (at the beginning of the process) and thereafter at or slightly above the top surface of the preform that is being built up. For this purpose, the turntable 70 and its rotary drive means are vertically movable (arrow F in FIG. 3).

In known manner, the support turntable 70 may be coated in a layer 76 forming a base felt, for example having fibers made of polypropylene, into which the needles can penetrate without being damaged while needling the initial layers of free fibers deposited on the turntable 70. A film 78, e.g. of polyethylene, can be disposed above the felt face 76 so as to avoid having too strong a bond between the annular fiber fabric and the base felt due to the needling. Document FR 2

626 294 describes a device for achieving annular needling of a fiber fabric obtained by depositing superposed layers of fibers on a rotary supporting turntable with the turntable moving progressively relative to the needling head.

The distance L along the feed zone of the cone 40 is selected to correspond to the width of the annular preform that is to be made. Defining the feed zone of the cone 40 between two generator lines or meridian planes of the cone gives it a shape that corresponds to a sector of a ring. The two meridian planes preferably form between them an angle lying in the range 10° to 40°. Because of its trapezoidal section, the nozzle 32 enables a constant thickness to be deposited over the entire width of the deposition zone on the support turntable 70. The fibers from the taker-in rollers 22, 24 are projected in substantially uniform manner over the entire section of the nozzle 30, so the density of fibers deposited on the turntable 70 is substantially uniform. The compacting and the needling of the fibers contributes to conferring a desired value to this density, i.e. to the volume percentage of the fibers in the preform. An annular fiber preform is thus obtained directly that is capable of being handled and without any scrap material being cut off. The preform can then be densified with a carbon matrix in conventional manner so as to obtain a C/C composite brake disk.

Figure 4:
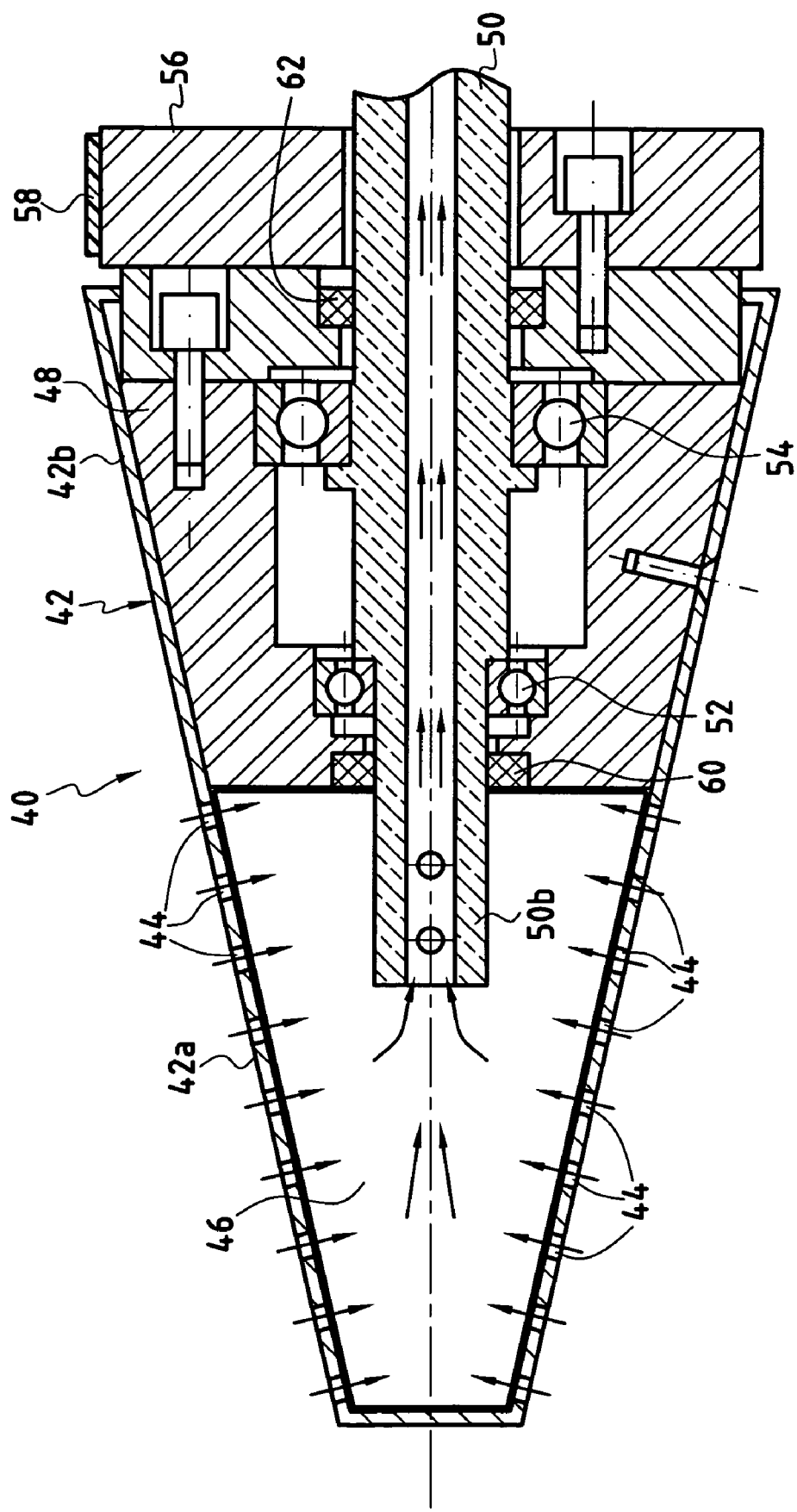
FIG. 4 is a longitudinal section view on a larger scale showing the feed cone of the installation of FIGS. 2 and 3.
Figure 5:
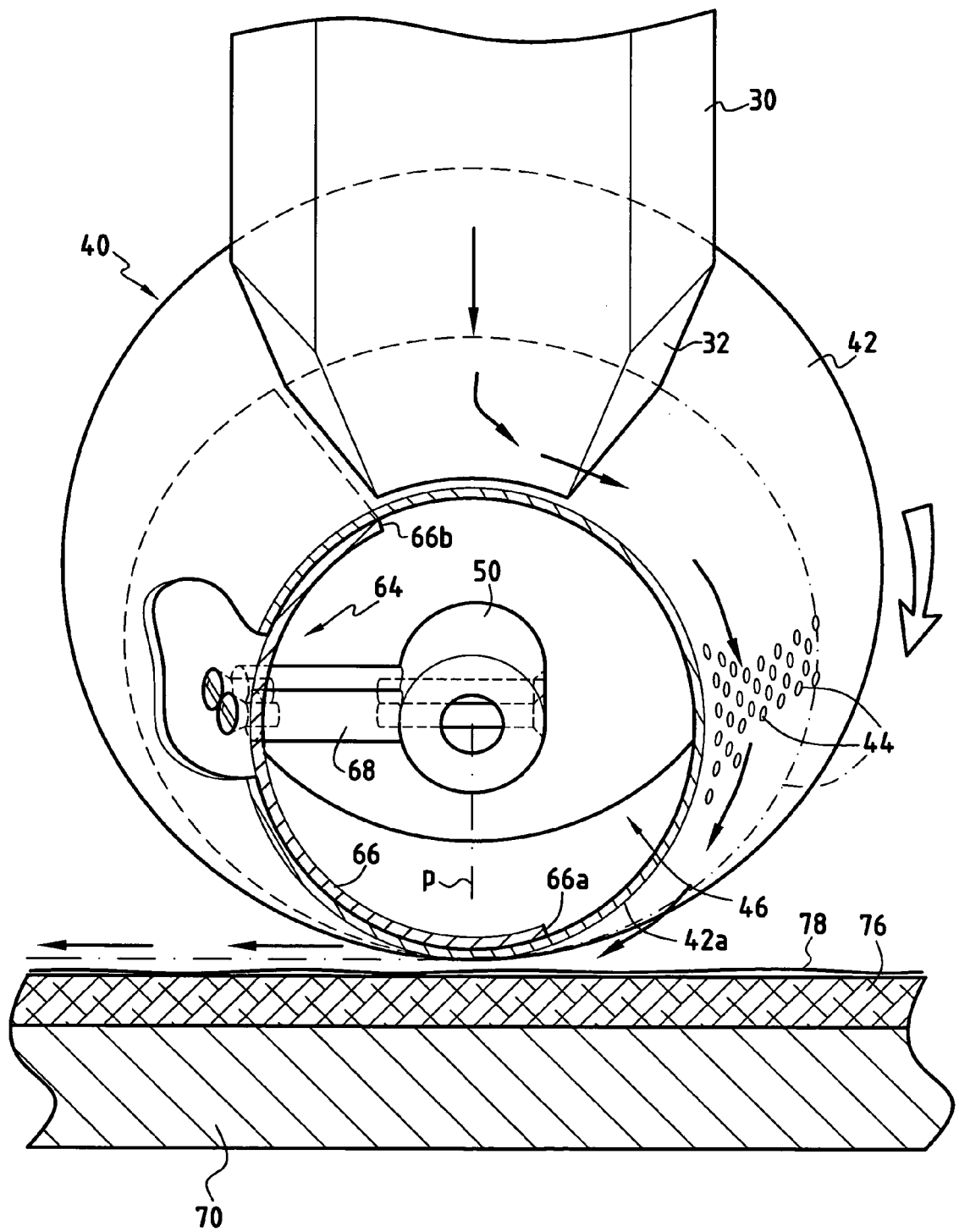
FIG. 5 is a section view on plane V-V of FIG. 3.

FIGS. 4 and 5 show the cone 40 in greater detail. The outer wall 42 of the cone comprises a portion 42b secured to a ring 48, and the portion 42a that is provided with the perorations 44, the portion 42a being situated, for example, beside the smaller-diameter end 40a of the cone.

The ring 48 has a frustoconical outside surface in contact with the inside surface of the portion 42b of the wall 42 and forms a bearing for assembling the cone 40 to a non-rotary shaft 50. Ball bearings 52, 54 are interposed between the ring 48 and the shaft 50, and the ring 48 is secured to a pulley wheel 56 having a belt 58 passing thereover, which belt is connected to a motor (not shown) for driving the cone 40 in rotation about its axis.

The space between the ring 48 and the closed end 40a of the cone 40 forms the chamber 46. This space communicates with a suction device (not shown) via an axial passage 50a in the shaft 50. Sealing rings such as 60 and 62 are interposed between the shaft 50 and the ring 48, and between the shaft 50 and the pulley 56.

The shaft 50 has an end 50b which projects into the chamber 46 and on which a stationary screen 64 is secured (shown in FIG. 5). The screen 64 has a solid wall 66 in the form of a sector of a cone extending in the immediate proximity of the inside surface of the perforated portion 42a of the wall 42. The wall 66 interrupts the suction effect through the perforations 44 when they come into register with the wall 66 during rotation of the cone 40, thereby allowing the fibers that were previously held by suction while being transported on the cone to fall under gravity. The screen 64 is mounted so as to release the fibers so that they become deposited on the turntable 70 in the deposition zone.

As shown in FIG. 5, the wall 66 extends between two meridian planes 66a and 66b. The upstream plane 66a (upstream in the direction of rotation of the cone) is situated at or slightly upstream from the meridian plane P containing the bottom horizontal generator line of the cone 40. The plane 66b is situated downstream from the plane P, and its position may be as far away as the inlet into the zone for feeding the cone with fibers, so that the surface of the cone is not covered in fibers when it enters into the zone for feeding the cone with fibers. Thus, the angle between the planes 66a and 66b may be as great as 180°, but its value could be smaller than that.

The wall 66 is secured to an arm 68 secured to the end 50a of the shaft 50.

The invention claimed is:

1. A method of manufacturing an annular fiber preform, the method being characterized in that free fibers are deposited on a rotary support turntable by means of a hollow deposition cone having a conical outer wall surrounding a chamber and pierced by multiple perforations, the cone being disposed above the turntable and having a generator line extending in the vicinity of the top surface of the turntable and substantially parallel thereto in a zone for depositing fibers on the turntable, the fibers being deposited on the turntable by a process comprising the steps which consist in:
    bringing fibers to the outer surface of the perforated wall of the cone in a cone feed zone that is remote from the deposition zone on the turntable;
    holding the fibers against the outer surface of the perforated wall of the cone by establishing suction inside the chamber, thereby producing suction through the perforations in the wall of the cone;
    transporting the fibers from the cone feed zone to the zone for deposition on the turntable by rotating the cone about its axis; and
    ceasing to hold the fibers on the cone in the deposition zone by localized interruption of the suction through the perforations in the wall of the cone, at least in said zone, so that the transported fibers are deposited on the turntable which is driven in rotation about its own axis simultaneously with the cone rotating.

2. A method according to claim 1, characterized in that the fibers are brought to the outer surface of the perforated wall of the cone over a fraction of said surface which extends between two generator lines of the cone, over a length measured along a generator line that is substantially equal to the width of the annular preform that is to be made.

3. A method according to claim 2, characterized in that the meridian planes passing through said two generator lines form between them an angle that preferably lies in the range 10° to 40°.

4. A method according to claim 1, characterized in that the fibers are brought to the outer surface of the perforated wall of the cone by passing through a feed channel.

5. A method according to claim 1, characterized in that the fibers are compressed after being deposited on the turntable.

6. A method according to claim 1, characterized in that the fibers are deposited on the turntable in a plurality of superposed layers.

7. A method according to claim 6, characterized in that the distance between the turntable and the cone is enlarged progressively as the successive layers of fibers are deposited.

8. A method according to claim 1, characterized in that the fibers deposited on the turntable are bonded together to constitute a fiber preform that can be manipulated.

9. A method according to claim 8, characterized in that the fibers are bonded together by needling.

10. A method according to claim 3, characterized in that:
    the fibers are brought to the outer surface of the perforated wall of the cone by passing through a feed channel;
    the fibers are compressed after being deposited on the turntable;
    the fibers are deposited on the turntable in a plurality of superposed layers;
    the distance between the turntable and the cone is enlarged progressively as the successive layers of fibers are deposited;
    the fibers deposited on the turntable are bonded together to constitute a fiber preform that can be manipulated;
    the fibers are bonded together by needling.

11. An installation for manufacturing an annular fiber preform, the installation comprising a rotary support turntable and means for bringing fibers to the turntable, the installation being characterized in that it further comprises:
- a feed cone that is rotatable about its axis, having an outer wall of conical shape surrounding a chamber and pierced by multiple perforations, the cone being disposed above the turntable and having a generator line extending in the vicinity of the outer surface of the turntable and substantially parallel thereto in a zone for depositing fibers on the turntable;
- fiber delivery means opening out in the vicinity of the outer surface of the perforated wall of the cone, in a cone feed zone remote from the zone for deposition on the turntable;
- means for establishing suction inside the cone chamber in order to establish suction through the perforations in the wall of the cone; and
- a device for localized interruption of the suction, which device is interposed between the means for establishing suction in the chamber and the perforations in at least a fraction of the wall of the cone situated in the zone for depositing fibers on the turntable.

12. An installation according to claim 11, characterized in that it further comprises a taker-in device suitable for delivering free fibers, and a fiber feed channel which extends between the taker-in device and the cone feed zone.

13. An installation according to claim 12, characterized in that the feed channel, at least in its portion adjacent to the cone presents a section that is trapezoidal.

14. An installation according to claim 11, characterized in that at least one conical compression roller is disposed above the support turntable downstream from the zone for depositing fibers on the turntable.

15. An installation according to claim 11, characterized in that a needling device is disposed above the support turntable downstream from the zone for depositing fibers on the turntable.

16. An installation according to claim 11, characterized in that the distance between the support turntable and the feed cone is variable.

17. An installation according to claim 11, characterized in that the device for localized interruption of suction comprises a fixed screen extending along and close to a fraction of the perforated wall of the rotary cone.

18. An installation according to claim 13, characterized in that:
- at least one conical compression roller is disposed above the support turntable downstream from the zone for depositing fibers on the turntable;
- a needling device is disposed above the support turntable downstream from the zone for depositing fibers on the turntable;
- the distance between the support turntable and the feed cone is variable;
- the device for localized interruption of suction comprises a fixed screen extending along and close to a fraction of the perforated wall of the rotary cone.

* * * * *